(12) United States Patent
Hisaeda (10) Patent No.: US 7,379,028 B2
(45) Date of Patent: May 27, 2008

(54) ANTENNA-EMBEDDED LAMINATED GLASS AND METHOD FOR PREPARING THE SAME

(75) Inventor: Katsumi Hisaeda, Aichi (JP)

(73) Assignee: Asahi Glass Company, Limited, Tokyo (JP)

( * ) Notice: Subject to any disclaimer, the term of this patent is extended or adjusted under 35 U.S.C. 154(b) by 103 days.

(21) Appl. No.: 11/261,509

(22) Filed: Oct. 31, 2005

(65) Prior Publication Data

US 2006/0092085 A1 May 4, 2006

(30) Foreign Application Priority Data

Nov. 1, 2004 (JP) ............................. 2004-318022

(51) Int. Cl.
*H01Q 1/32* (2006.01)
(52) U.S. Cl. ...................... 343/713; 343/704; 219/203
(58) Field of Classification Search ............... 343/704, 343/711, 712, 713
See application file for complete search history.

(56) References Cited

U.S. PATENT DOCUMENTS 4,260,989 A * 4/1981 Ishii et al. .................. 343/704
4,439,771 A * 3/1984 Kume et al. ................ 343/704
5,324,374 A 6/1994 Harmand et al.
5,792,298 A 8/1998 Sauer et al.

FOREIGN PATENT DOCUMENTS

| GB | 1 276 057 | 6/1972 |
| JP | 2-82701 | 3/1990 |
| JP | 2001-119219 | 4/2001 |

\* cited by examiner

*Primary Examiner*—Tho Phan
(74) *Attorney, Agent, or Firm*—Oblon, Spivak, McClelland, Maier & Neustadt, P.C.

(57) ABSTRACT

The present invention provides a method for preparing an antenna-embedded laminated glass with an antenna element sealed between glass sheets, which is characterized to comprise forming two or more glass sheets forming the laminated glass; bonding a transfer film on a surface of one of the glass sheets by a boding strip, the transfer film including the bonding strip and a conductive strip forming the antenna element; and press-bonding glass sheet, through a intermediate film, to the surface of the one glass sheet with the transfer film bonded thereto.

17 Claims, 9 Drawing Sheets

ANTENNA-EMBEDDED LAMINATED GLASS AND METHOD FOR PREPARING THE SAME

BACKGROUND OF THE INVENTION

1. Field of the Invention

The present invention relates to an antenna-embedded laminated glass with an antenna element sealed between glass sheets and a method for preparing the same.

2. Description of the Related Art

Heretofore, an antenna sheet, which comprises a conductive strip for an antenna element and an adhesive layer disposed on a base sheet, has been known (see, e.g., JP-A-2001-119219). This antenna sheet can function as a glass antenna by being bonded to a surface of a glass sheet through the adhesive layer.

Such an antenna sheet is affixed to a surface of a glass sheet in use. From this viewpoint, when such an antenna sheet is bonded to, e.g., an interior surface of the front windshield of a vehicle, the conductive strip needs to be covered with a transparent protective layer. The protective layer is disposed for the purpose of preventing the conductive strip from being damaged and being disconnected by an external force. In some cases, a boundary line between the protective layer and the glass sheet with the antenna sheet affixed thereto is visible since the protective layer has a different refractive index from the glass sheet, and the protective layer covers the glass sheet over a relatively wide area. For these reasons, such an antenna sheet has a problem of poor appearance and a problem of obstructing a driver's view.

On the other hand, in an antenna-embedded laminated glass with an antenna element sealed between glass sheets (see, e.g., JP-A-2-82701), an antenna element is protected by the glass sheets. Even when such an antenna-embedded laminated glass is applied to an automobile windshield, there is no problem, such as a poor appearance caused by the provision of a protective layer in a region except for the provision of the antenna element.

Such an antenna-embedded laminated glass is classified into a print type wherein conductive paste is printed in a desired pattern on an inner surface (mating surface) of a glass sheet to from an antenna element, and an intermediate film embedded type wherein an antenna wire is embedded in an intermediate film (typically made of polyvinyl butyral) interposed between glass sheets.

The above-mentioned print type cannot solve the problems from the viewpoint of a poor appearance or the like since an antenna pattern needs to have a wide line width in order to ensure desired antenna performance because of the presence of large wire resistance.

In this regard, the above-mentioned intermediate film embedded type is advantageous from the viewpoint of poor appearance or the like since an antenna wire having a small diameter can be embedded in an intermediate film.

However, in the case of the above-mentioned intermediate film embedded type, the intermediate film with an antenna wire embedded therein expands or contracts in a heat treatment process, such as press-bonding, to displace the position of the antenna wire in some cases. This is because a laminated glass is produced by sandwiching an intermediate film between two glass sheets, followed by press-bonding and heat treatment. The tendency of such positional displacement causes a problem from the viewpoint of antenna performance. Additionally, there is a problem from the viewpoint of the stability of antenna performance since the tendency of such positional displacement is a major factor in variations in the positions of the antenna patterns of respective final products.

SUMMARY OF THE INVENTION

It is an object of the present invention to provide an antenna-embedded laminated glass, which is capable of making it difficult to cause the positional displacement of an antenna pattern during production and of having a good appearance or the like, and a method for preparing the same.

In order to solve the above-mentioned problem, according to a first aspect of the present invention, there is provided a method for preparing an antenna-embedded laminated glass comprising a plurality of glass sheets affixed together through an intermediate film to seal an antenna element between adjacent glass sheets, the intermediate film comprising a resin; the method comprising forming a plurality of glass sheets in a curved shape; laminating the glass sheets, the antenna element and an intermediate film to form a laminated structure; and press-bonding the glass sheets while interposing the intermediate film between the adjacent glass sheets; wherein the laminating step comprises forming the laminated structure by bonding a transfer film to form a conductive film on a surface of at least one of the glass sheets by use of a bonding strip, the transfer film including the bonding strip and the conductive strip, the conductive strip forming the antenna element, the surface confronting the intermediate film.

In this aspect, the conductive strip may include a linear portion formed in a desired pattern and having a line width (W) satisfying the formula of $0.15 \leq W \leq 0.4$ mm. The surface, to which the transfer film is bonded, may comprise a convex surface of the at least glass sheet having a curvature.

According to another aspect of the present invention, there is provided an antenna-embedded laminated glass, comprising a plurality of glass sheets affixed together through an intermediate film to seal an antenna element between adjacent glass sheets, the intermediate film comprising a resin; and the antenna element comprising a conductive strip fixed to a surface of at least one of the adjacent glass sheets by a bonding strip, the surface confronting the intermediate film.

As explained, in accordance with the present invention, the press-bonding process for press-bonding glass sheets with an intermediate film sandwiched therebetween can be performed while the conductive strip forming an antenna element is bonded to a surface (mating surface) of a glass sheet by the adhesive strip. Accordingly, it is possible to prevent the antenna element (conductive strip) from causing positional displacement with respect to the glass sheets by expansion or contraction of the intermediate film during the press-bonding process and to produce an antenna-embedded laminated glass having high positional precision of the antenna element. When the conductive strip forming the antenna element has a line width ranging from 0.15 to 0.4 mm, it is possible to obtain an antenna-embedded laminated glass having a good appearance or the like.

DETAILED DESCRIPTION OF THE PREFERRED EMBODIMENTS

Now, preferred embodiments of the present invention will be described, referring to the accompanying drawings.

Figure 1:
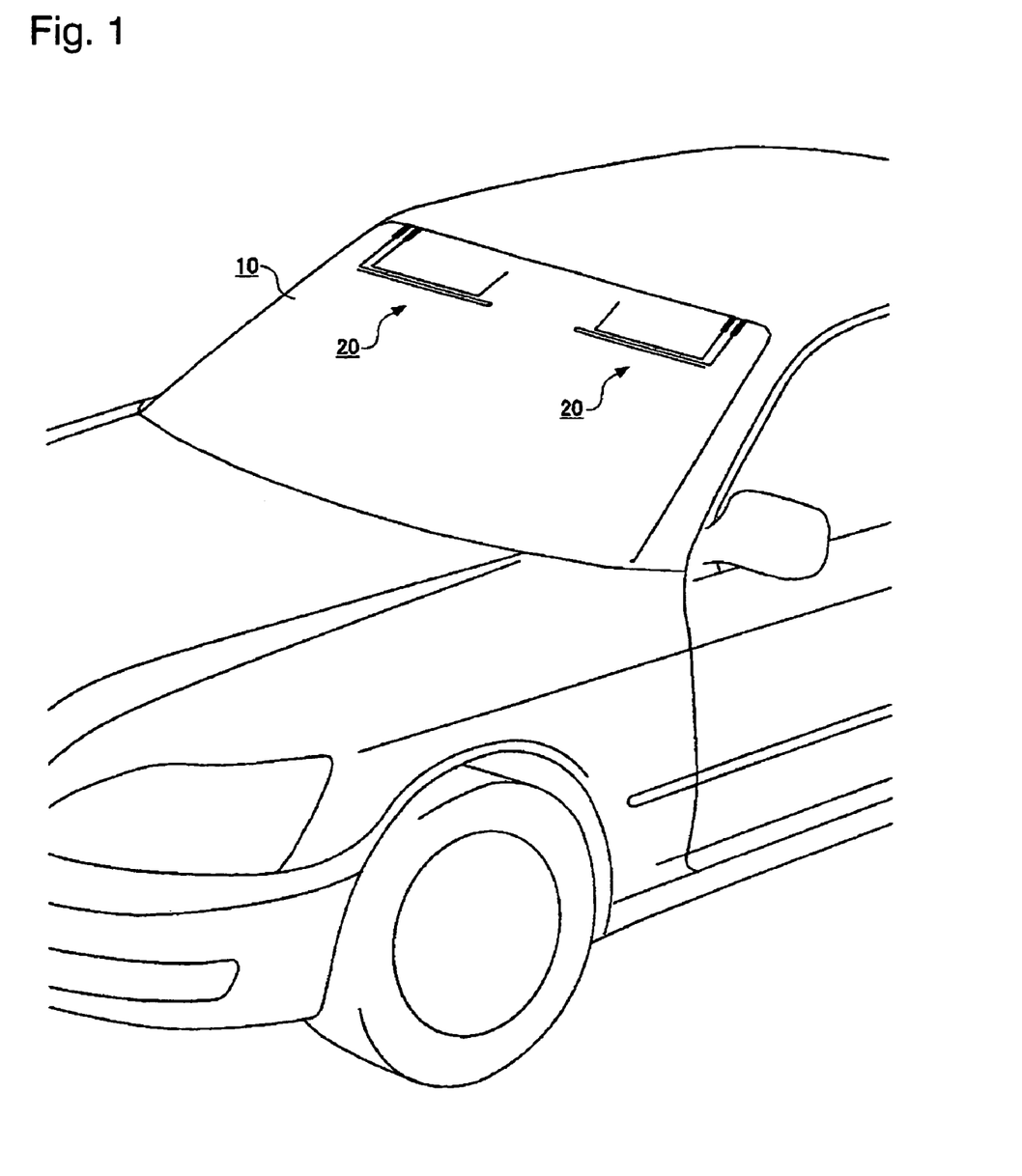
FIG. 1 is a perspective view showing an application example wherein an antenna-embedded laminated glass according to the present invention is applied as the front windshield of an automobile.

FIG. 1 shows an application example of an antenna-embedded laminated glass according to the present invention. Although the antenna-embedded laminated glass 10 is normally used as the front windshield of an automobile as in this application example, the laminated glass may be used as a side windshield or the rear windshield of an automobile.

Figure 8:
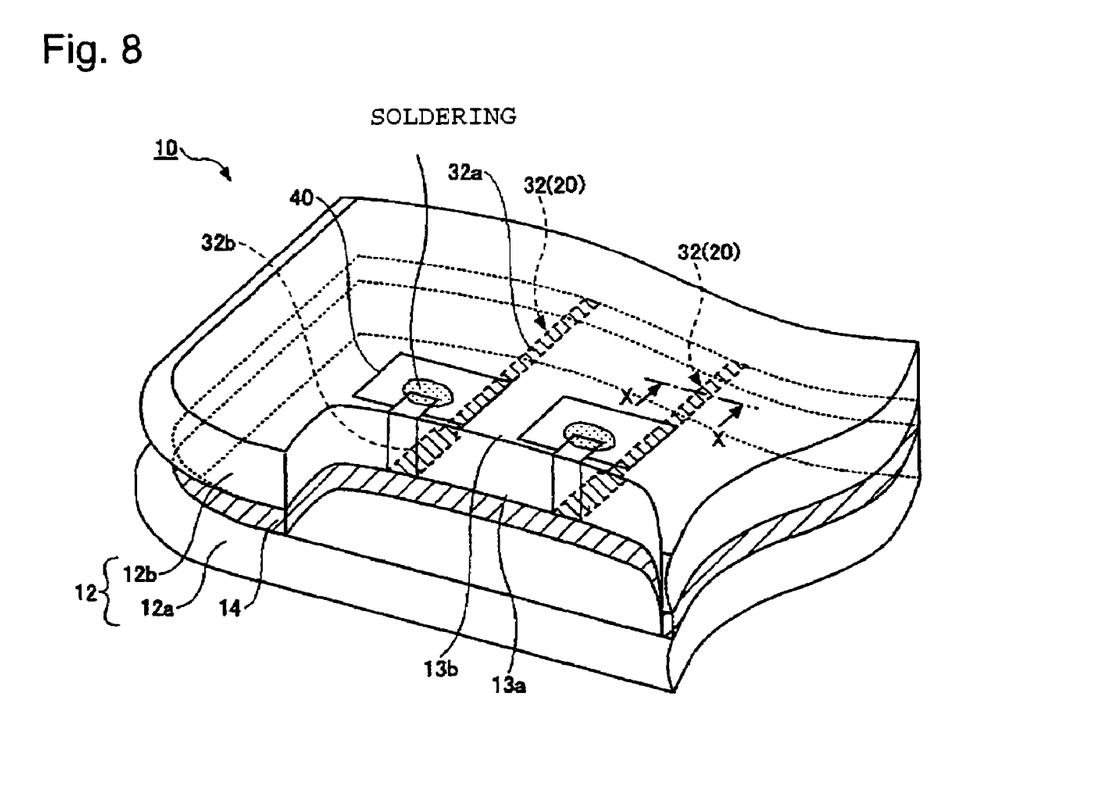
FIG. 8 is a perspective view showing a first embodiment of the electrode lead-out structure of the antenna element in an antenna-embedded laminated glass produced by the present invention.

The laminated glass 10 is produced by press-bonding a plurality of glass sheets 12 with an intermediate film 14 interposed therebetween (see FIG. 8). The intermediate film 14 may be made of, e.g., polyvinyl butyral (PVB).

Glass sheets 12 forming the laminated glass 10 have an antenna element 20 sealed therebetween as stated later. The antenna element 20 may be formed in a desired pattern as shown in FIG. 1 and receive, e.g., an electromagnetic wave from a television station or a radio station, an electromagnetic wave from a cell-phone, or an electromagnetic wave from a satellite. In this application example, the antenna element 20 is protected by the glass sheets 12 since the antenna element 20 is sealed between the glass sheets 12.

Figure 2:
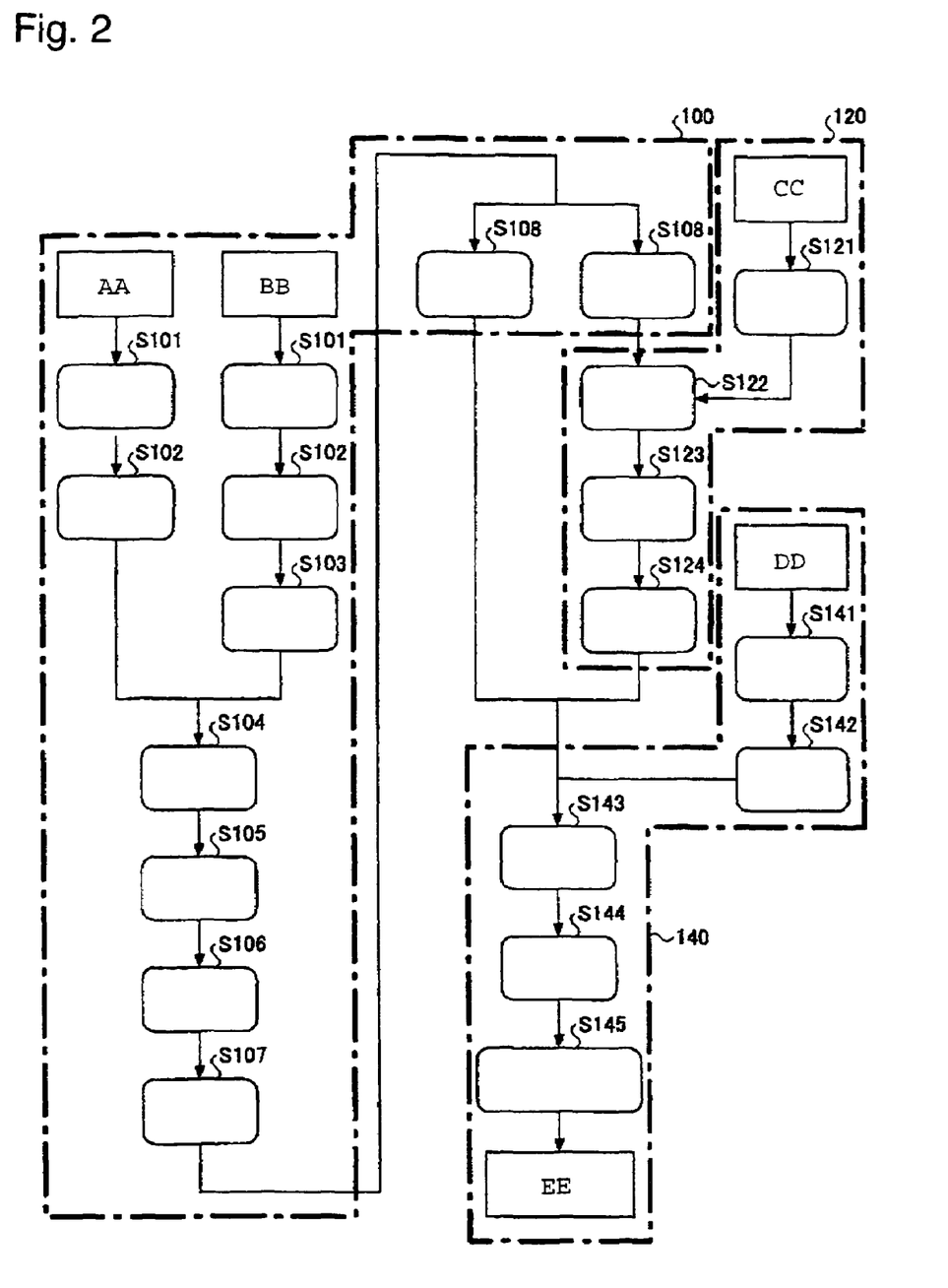
FIG. 2 is a flow sheet showing essential portions of a process for producing an antenna-embedded laminated glass, according to the present invention.

FIG. 2 is a flow sheet showing essential portions of a process for producing an antenna-embedded laminated glass, according to the present invention. Now, explanation will be made about a case wherein the laminated glass 20 comprises two glass sheets 12, and wherein the glass sheet that is located on an exterior side when the laminated glass is mounted to a vehicle is indicated by reference numeral 12a, and the glass that is located on an interior side is indicated by reference numeral 12b.

As shown in FIG. 2, the process for producing a laminated glass, according to this embodiment comprises a glass sheets forming process 100, a conductive strip transferring process 120 and a glass sheets laminating process 140.

In the glass sheets forming process 100, two basic glass sheets are independently subjected to cutting and chamfering steps (Step 101), and cleaning and drying steps (Step 102). In order to conceal an eyesore, a print is applied to an edge portion of the basic glass sheet (interior glass sheet) that forms the glass sheet 12b on the interior side of the two basic glass sheets (Step 103). The print may be applied to an edge portion of the exterior glass sheet 12a or may be applied to each of the exterior glass sheet and the interior glass sheet. After that, both glass sheets are overlapped with each other (Step 104), and both glass sheets have edge portions carried on a frame, being overlapped each other. Next, the glass sheets thus overlapped are heated to a temperature of not lower than the softening point and are bent in a curved shape by gravity (Step 105). Then, both sheets are subjected to annealing (Step 106), and both sheets are separated from each other (Step 107). Thus, the glass sheets 12a and 12b are provided with surfaces having substantially the same curvatures as each other. The glass sheets 12a and 12b are subsequently and independently subjected to washing and drying steps (Step 108) and are transferred into the conductive strip transferring process 120.

In the conductive strip transferring process 120, an antenna sheet 30 is affixed on an exterior surface of the glass sheet 12b. The exterior surface of the glass sheet 12b is an exterior surface of the interior glass sheet 12b as stated earlier, that is to say, a surface of the glass sheet 12b confronting the glass sheet 12a when being laminated with the glass sheet 12b (hereinbelow, referred to as "the mating surface 13a".

Figure 3:
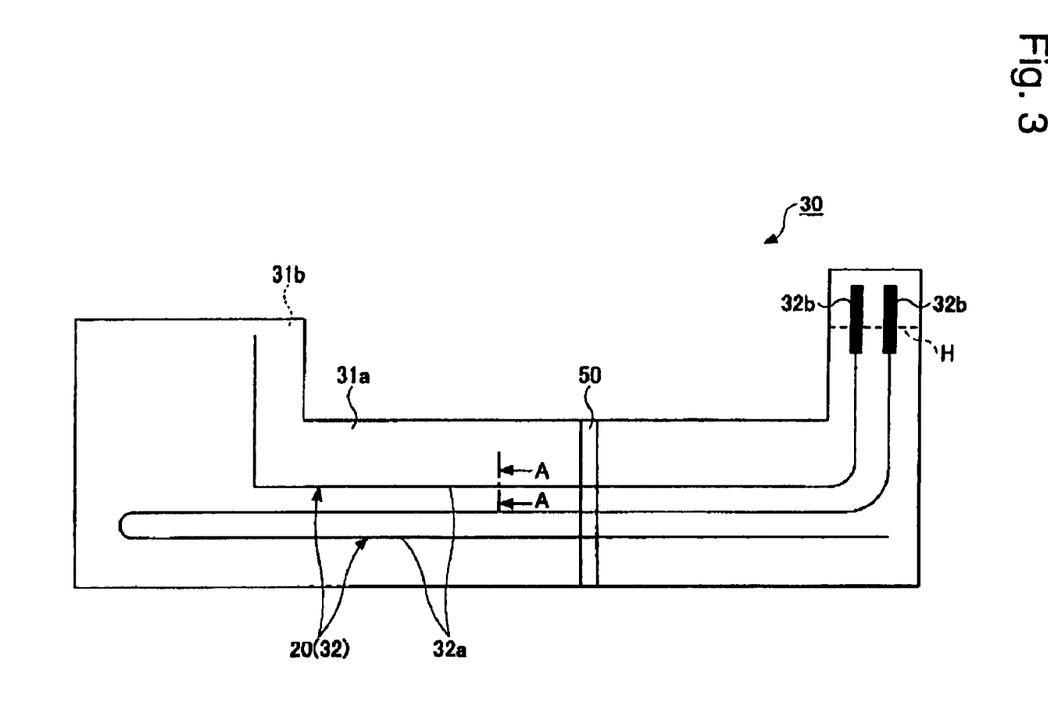
FIG. 3 is a schematic view showing the antenna sheet according to an embodiment of the present invention.
Figure 4:
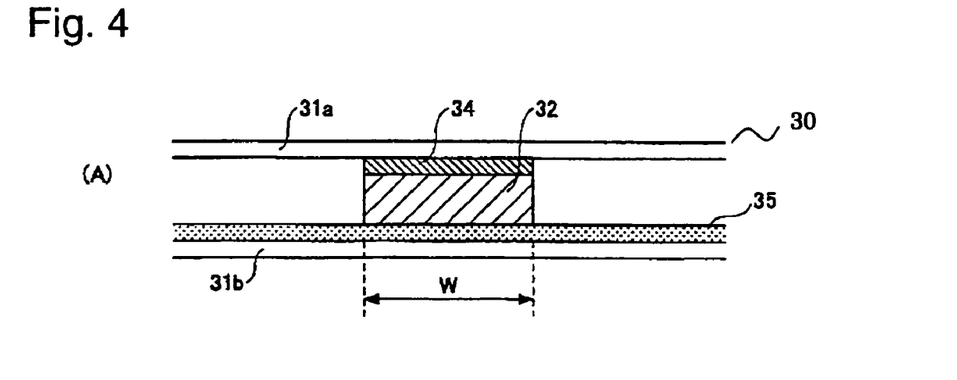
FIG. 4 is a cross-sectional view taken along line A-A of FIG. 3.

As shown in FIG. 3, the antenna sheet 30 is a sheet material having a desired shape. As shown in FIG. 4 (showing a cross-sectional view taken along line A-A of FIG. 3), the antenna sheet 30 comprises a transfer film material containing a conductive strip 32 for forming at least one antenna element 20 and a bonding strip 34. The conductive strip 32 and the bonding strip 34 are disposed between a first detachable layer (mount) 31a formed in the desired shape and a second detachable layer (protective film) 31b. The first detachable layer is a mount, which serves to hold the antenna pattern formed by the conductive strip 32 until the conductive strip 32 and the bonding strip 34 are fixed to the mating surface 13a of the glass sheet 12b. Since the transfer film material includes the mount, it is possible not only to handle and fix the conductive strip but also to prevent the antenna pattern from being deformed. The second detachable layer is a protective film, which serves to protect the conductive strip until the conductive strip 32 and the bonding strip 34 are fixed to the mating surface 13a of the glass sheet 12b. Since the transfer film material includes the protective film, it is possible to prevent the antenna pattern from being deformed or broken by an external force. From this viewpoint, it is preferred that the second detachable layer be detached immediately before the transfer film material is disposed on and fixed to the mating surface 13b. The conductive strip 32 and the second detachable layer 31b have an adhesive layer 35 interposed therebetween. The adhesive layer 35 bonds the conductive strip 32 to the second detachable layer 31b by an easily-detachable adhesive force. The first detachable layer 31a has a slit 50 formed in each region in consideration of workability in detaching operation.

Figure 5A:
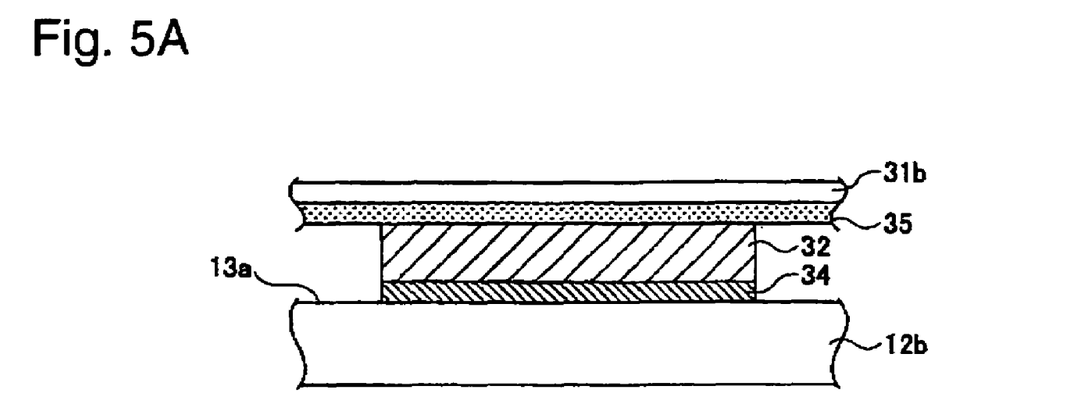
FIGS. 5A and 5B are schematic views explaining a conductive strip transferring process.

In the conductive strip transferring process 120, the first detachable layer (mount) 31a is first detached from the antenna sheet 30 (Step 121), and the antenna sheet 30 with the first detachable layer detached therefrom is located at and bonded to a desired position on the mating surface 13a of the glass sheet 12b (Step 122). At that time, the conductive strip 32 is bonded to the mating surface 13a of the glass sheet 12b by the bonding strip 34 as shown in FIG. 5A. In order to ensure that the bonding strip 34 and the mating surface 13a are bonded together, the antenna sheet 30 may be pressed against the mating surface 13a of the glass sheet 12b.

Figure 5B:
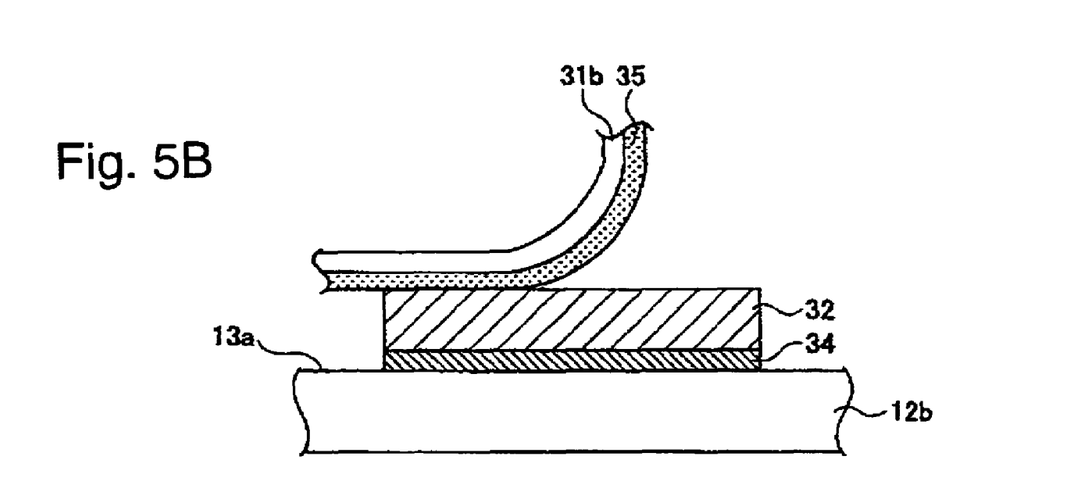

Next, the second detachable layer (protective film) 31b is detached along with the adhesive layer 35 from the conductive strip 32 as shown in FIG. 5B (Step 123). Thus, the first detachable layer 31a and the second detachable layer 31b are removed, and only the conductive strip 32 and the bonding strip 34 remain on the mating surface 13a of the glass sheet 12b. It is clear that the adhesive force between the adhesive layer 35 and the conductive strip 32 is adjusted to be sufficiently smaller than the bonding force of the bonding strip 34. The adhesive force thus adjusted is set to have a degree to prevent the conductive strip 32 from being detached along with the bonding strip 34 from the mating surface 13a of the glass sheet 12b or the conductive strip 32 from being detached from the bonding strip 34 when detaching the second detachable layer 31b.

After that, as required, treatment, such as bending an end portion of the antenna element 20 from an edge portion of the glass sheet 12b (see FIG. 8), may be performed for connection of the antenna element 20 (conductive strip 32) to an electrode 40 (see FIG. 8) (Step 124).

When the process 120 for bonding the antenna sheet to the glass sheet 12b is completed as stated earlier, the process proceeds to the glass sheets laminating process 140 to laminate the glass sheet 12b and the glass sheet 12a.

In the glass sheets laminating process 140, the glass sheets, the antenna element and the intermediate film for affixing the antenna element and the glass sheets are formed into a laminated structure, interposing the intermediate film between the glass sheets, and the glass sheets, the antenna element and the intermediate film are press-bonded to obtain a laminated glass. Specifically, the intermediate film 14 is first cut out into substantially the same shape as the glass sheets 12a and 12b, being subjected to a washing step and a film cutting step (Steps 141 and 142), and the intermediate film thus cut out is interposed into between the glass sheet 12a and 12b (Step 143). Thus, the intermediate film 14 is interposed between the mating surface 13a of the glass sheet 12b with the above-mentioned conductive strip 32 bonded thereto and the mating surface of the glass sheet 12a, providing the laminated structure. Next, both glass sheets 12a and 12b are preliminarily press-bonded (Step 144), and both glass sheets are primarily press-bonded together by an autoclave (pressure vessel) (Step 145). As a result, the bonding surfaces between the intermediate film 14 and each of both glass sheets 12a and 12b are completely evacuated and melt-bonded, and thus the laminated glass 10 is completed.

In the process wherein the air on the interface between the intermediate film 14 and each of the glass sheets is evacuated to completely press-bond both glass sheets 12a and 12b, not only a pressure but also heat is applied to the intermediate film. Accordingly, the intermediate film 14 is contracted between both glass sheets 12a and 12b. For this reason, in the case of a structure wherein the antenna wire is disposed on the side of the intermediate film 14, or a structure wherein a second film with an antenna pattern printed thereon is interposed between the intermediate film 14 and a glass sheet 12, the antenna wire or the second film is likely to cause positional displacement by expansion or contraction of the intermediate film 14.

On the other hand, in this embodiment, the antenna element 20 is bonded as the conductive strip 32 to the mating surface 13a of the glass sheet 12b by the bonding strip 34 as stated earlier. Accordingly, the conductive strip 32 is prevented from being shifted with respect to the mating surface 13a of the glass sheet 12b by expansion or contraction of the intermediate film 14. In accordance with this embodiment, there is no possibility that the antenna element 20 is subjected to positional displacement with respect to the glass sheet 12b during production. As a result, the antenna element (antenna pattern) 20 can have positional precision improved to be provided with desired antenna performance. The variations in the positions of antenna elements (antenna patterns) 20 that can be caused in respective final products can be remarkably reduced to make antenna performance stable.

The positional precision of the antenna element (antenna pattern) 20 has influences not only on the electrical connection with a vehicle side but also the positional relationship with a peripheral member serving as ground when the antenna element is mounted to a vehicle. For this reason, the positional precision of the antenna element 20 also has an influence on antenna performance in some cases. Specifically, when the antenna element 20 is mounted to the front windshield of an automobile, the antenna element is influenced by the positional relationship with a body pillar in some cases.

The influence on the antenna performance is significant, in particular, when the antenna element 20 serves as receiving an electromagnetic wave having a high frequency, such as digital broadcasting. From this viewpoint, the antenna-embedded laminated glass 10 produced by this embodiment can exhibit desired antenna performance with variations in respective final products minimized even when the laminated glass is applied to such an application.

Additionally, the antenna sheet 30 (the conductive strip 32) is bonded to the mating surface 13a of the glass sheet 12b, which is a convex side, in this embodiment. In this case, a tension is placed on the antenna sheet 30 at the time of affixture as opposed to a case the antenna sheet 30 is affixed to a concave side (for example, the interior surface of the glass sheet 12a). Accordingly, the antenna sheet 30 is unlikely to be wrinkled, providing good workability. Additionally, the weather resistance of the antenna element 20 is improved since the conductive strip 32 is located on a position closer to the interior of the vehicle than the intermediate film 14 having a UV cutting function.

Although the conductive strip transferring process 120 may be manually performed by an operator in this embodiment, this process may be automated, using, e.g., a robot. The antenna sheet 30 does not always need to be delivered, being separated from other antenna sheets. As another delivery mode, plural antenna sheets 30, which are separable from each other, are continuously wound on a roll, and the respective antenna sheets may be separated from each other, being unwound from the roll on the production line.

Figure 6A:
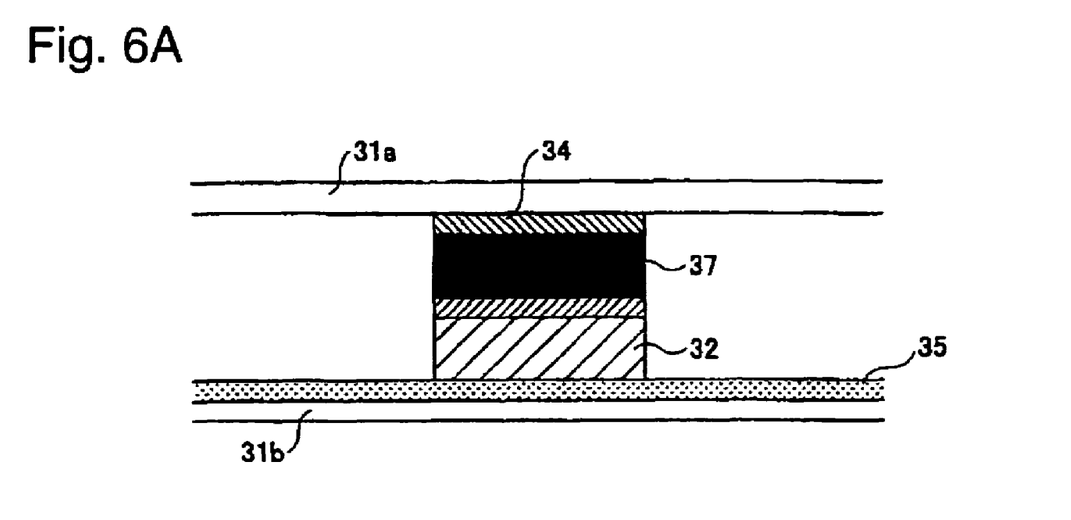
FIG. 6A is a cross-sectional view taken along line A-A of FIG. 3, showing the antenna sheet according to another embodiment.
Figure 6B:
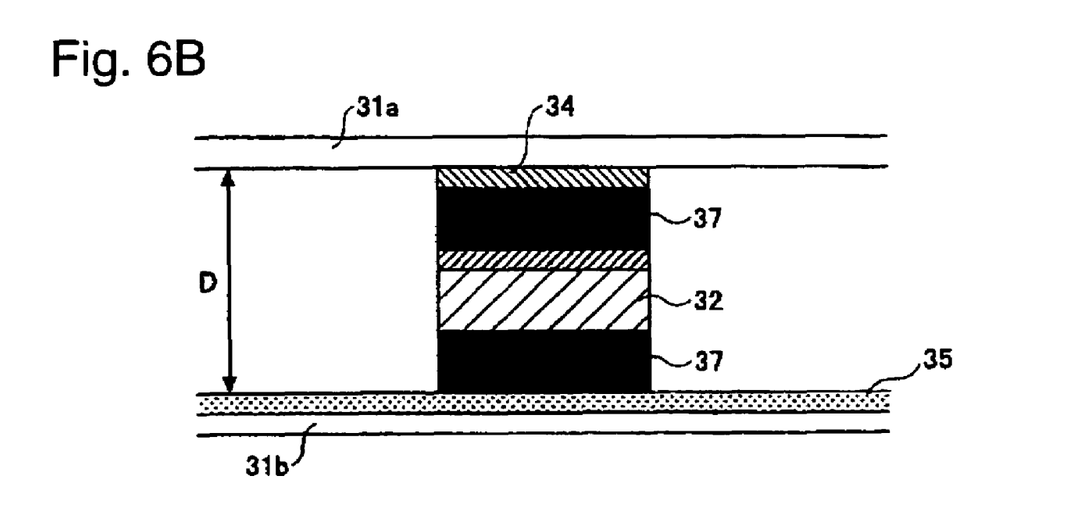
FIG. 6B is a cross-sectional view taken along line A-A of FIG. 3 showing the antenna sheet according to another embodiment.

FIGS. 6A and 6B show other embodiments of the antenna sheet 30, which are different from the embodiment shown in FIG. 4, and these figures correspond to the cross-sectional view taken along line A-A of FIG. 3.

The antenna sheets 30 shown in FIG. 6A includes a dark strip 37 laminated on an interior side of the conductive strip 32 through a bonding strip. The dark strip 37 comprises a black paint having a low reflectance and is disposed so as to make the conductive strip 32 invisible from a vehicle interior side in terms of good appearance. The dark strip 37 functions to protect the conductive strip 32 to increase the strength and the stability of the conductive strip. The antenna sheet 30 shown in FIG. 6B includes dark strips 37 disposed both sides of the conductive strip 32. As shown in these figures, the antenna sheet 30 may appropriately include various kinds of layers in addition to the conductive strip 32 and the bonding strip 34. The thickness of each of the strips and the layers may be appropriately set. For example, the transfer film material shown in FIG. 6B may have a total thickness D of about 0.3 mm. These figures show embodiments wherein a dark strip or dark strips using a black paint are applied by printing for concealing an eyesore. However, the color of the dark strip or the dark strips is not limited to black. Any other colors, such as gray or dark brown, are acceptable as long as a selected color can shield visual light or ultraviolet light.

The conductive strip 32 may be made of soft copper. The bonding strip 34 or the adhesive layer 35 may be made of an acrylic adhesive material. The second detachable layer may be made of a polyester film. The first detachable layer 31a may be made of woodfree paper having a single side polylaminated or a resin sheet (such as a PET sheet), which is treated so as to have a detachable property.

Figure 7:
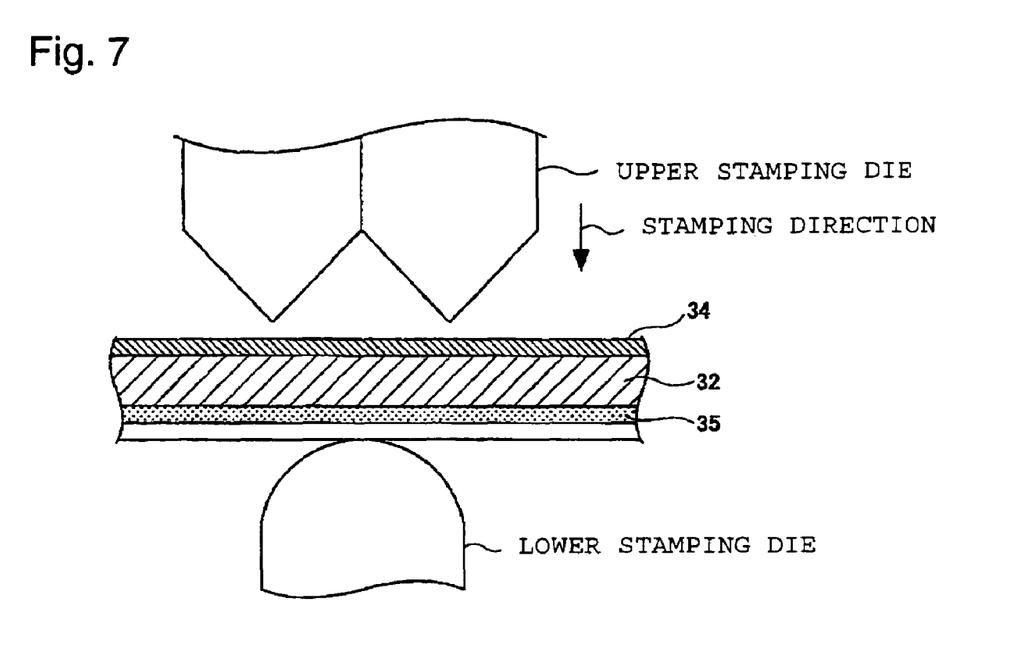
FIG. 7 is a schematic view showing how a transfer film material is stamped out when producing the antenna sheet showing in FIG. 3 and FIG. 4.

The pattern of each of the antenna elements 20 as shown in FIG. 3 may be formed by using a press to stamp, with desired dies, a transfer film material comprising various kinds of layers and the strips. FIG. 7 shows how the transfer film material is stamped when preparing the antenna sheet 30 shown in FIG. 4. In this case, the transfer film material comprising the conductive strip 32 and the bonding strip 34 are stamped so as to have a line width W by the upper and lower die.

The line width W of the conductive strip 32 satisfies the formula of $0.15 \leq W \leq 0.4$ mm, preferably the formula of $0.2 \leq W \leq 0.3$ mm, in an antenna pattern portion as a portion excluding edge portions, an electrode portion or the like. This arrangement can provide the laminated glass with a good appearance and is advantageous from the viewpoint that the antenna element is prevented from obstructing a driver's view when the laminated glass is used as an automobile windshield. Explanation of this embodiment has been made about a case wherein the conductive strip 32 is formed by stamping a transfer film material. However, the conductive strip may be formed by printing conductive paste or using an antenna wire. The bonding strip may be formed by being laminated on the conductive strip before forming the pattern and the bonding strip or may be formed on a surface of the conductive strip after forming the pattern by the conductive strip.

The conductive strip 32 and the bonding strip 34 thus stamped are combined with both of the first detachable layer 31a and a transfer film material comprising the second detachable layer 31b and the adhesive layer 35, and the combination is passed between rollers to complete the antenna sheet 30.

FIG. 8 is a perspective view of a first embodiment of the electrode lead-out structure of the antenna element 20 in an antenna-embedded laminated glass 10 produced according to the above-mentioned embodiments.

This embodiment is related to an antenna-embedded laminated glass 10, which is produced by using the antenna sheet 30 shown in FIG. 3. In this embodiment, the electrode lead-out portion of each of the antenna elements 20 is formed from a portion of the conductive strip 32 having a relatively large line width W. In other words, the conductive strips 32 in this embodiment are stamped so that each of the conductive strips comprises a thin linear portion 32a having a line width W satisfying the equation of $0.15 \leq W \leq 0.4$ mm and an extension 32b made of the same material as the thin linear portion and having a relatively larger line width and a length.

Figure 9:
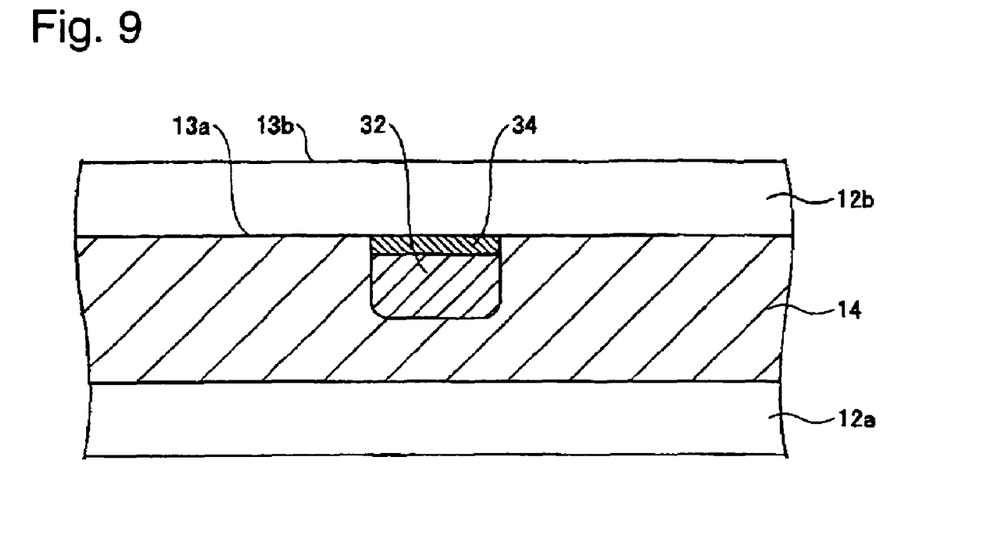
FIG. 9 is a cross-sectional view taken along line X-X of FIG. 8.

FIG. 9 is a cross-sectional view taken along line X-X of FIG. 8. The thin linear portion 32a and a portion of the extension 32b are bonded to the mating surface 13a of the glass sheet 12b by the bonding strip 34 as stated earlier. As seen from FIG. 9, the conductive strip 32 bonded to the glass sheet 12b by the bonding strip 34 is embedded in the intermediate film 14 after the primary press-bonding process is completed.

The extension 32b is folded at an edge portion of the glass sheet 12b toward an opposite surface 13b of the glass sheet 12b. This folding step is performed by folding a leading portion of the antenna sheet 30 toward the opposite surface 13b of the glass sheet 12b along a folding line H as shown in FIG. 3 and affixing an end portion of the antenna sheet to the opposite surface in the conductive strip transferring process 120.

An end of the extension 32b is connected to an electrode 40, which is formed on the opposite surface 13b of the glass sheet 12 by, e.g., printing. The connection between the edge of the extension 32b and the electrode 40 is made by soldering after the above-mentioned primary press-bonding treatment (Step 145) has been completed.

The electrode 40 is connected to an amplifier (not shown) through a wire (not shown), the amplifier being disposed on a vehicle side for amplifying an electromagnetic wave received by the antenna element 20. When the antenna is activated, an electromagnetic wave received by the antenna element 20 is taken out through the electrode 40, is subjected to processing (such as amplification) as required and is supplied to an in-vehicle media system, such as a TV receiver. The electromagnetic wave received by the antenna element 20 may be wirelessly transmitted an in-vehicle media system through a Bluetooth receiver or a wireless LAN receiver connected the electrode 40.

Figure 10:
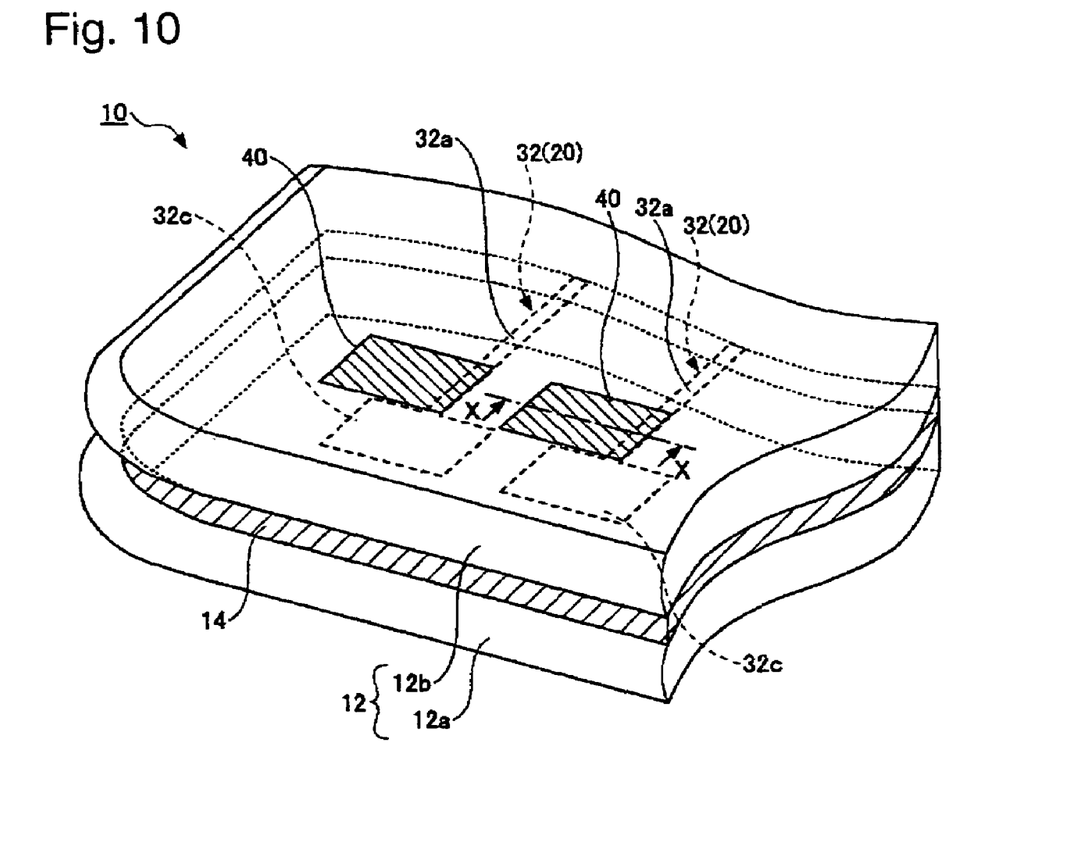
FIG. 10 is a perspective view showing a second embodiment of the electrode lead-out structure of the antenna element in an antenna-embedded laminated glass produced by the present invention.

FIG. 10 is a perspective view showing a second embodiment of the electrode lead-out structure of the antenna element 20 in an antenna-embedded laminated glass 10 produced according to the above-mentioned embodiment.

Figure 11:
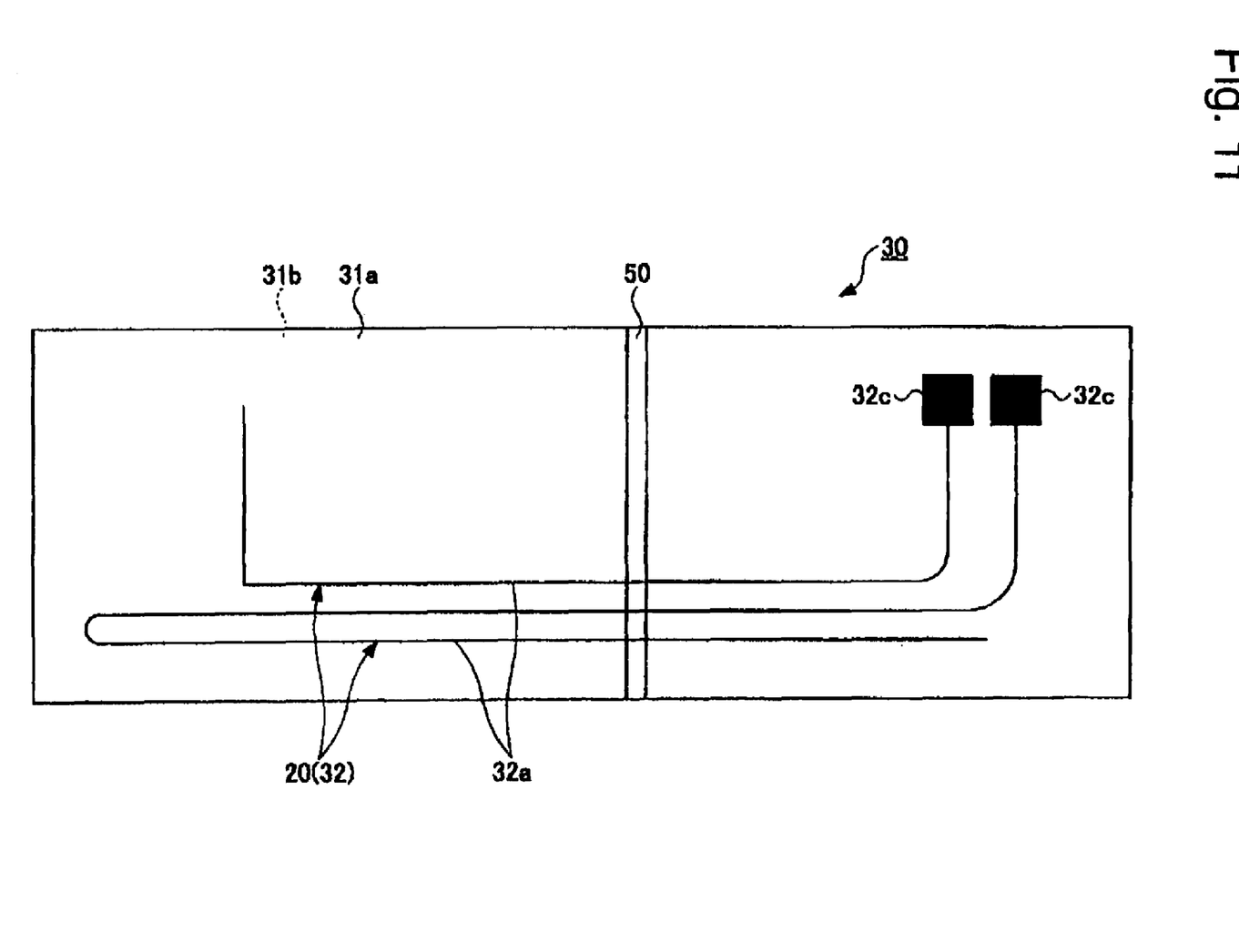
FIG. 11 is showing the antenna sheet corresponding to the embodiment shown in FIG. 10.

In this embodiment, each of the antenna elements 20 has an electrode per se comprising a portion of the conductive strip 32 formed in a desired shape. In other words, the conductive strips 32 in this embodiment are stamped so that each of the conductive strips comprises a thin linear portion 32a having a constant line width W satisfying the formula of $0.15 \leq W \leq 0.4$ mm and an electrode 32c having a region formed in a desired shape. FIG. 11 shows the antenna sheet 30 corresponding to this embodiment.

Figure 12:
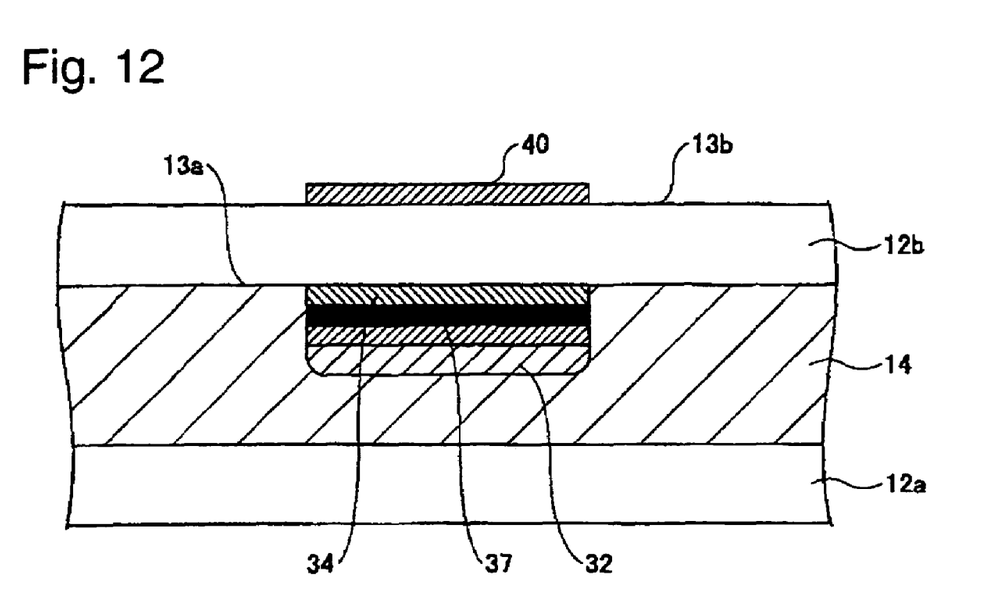
FIG. 12 is a cross-sectional view taken along line X-X of FIG. 10.

FIG. 12 is a cross-sectional view taken along line X-X of FIG. 10. The thin linear portion 32a and the electrode 32c are bonded to the mating surface 13a of the glass sheet 12b by the bonding strip 34 as stated earlier. In the embodiment shown in FIG. 12, an antenna sheet 30 having a laminated structure as shown in FIG. 6A as stated earlier is used. Thus, the electrode 32c is sealed as the conductive strip 32 between both glass sheets 12a and 12b of a laminated glass 10.

The opposite surface 13b of the glass sheet 12b has an electrode 40 disposed at a position to confront the electrode 32c by, e.g., printing. Thus, the electrode 40 and its corresponding electrode 32c can be connected through static capacitive coupling (electromagnetic coupling). The electrode 40 is connected to an in-vehicle amplifier (not shown) through a wire (not shown), the amplifier serving as amplifying an electromagnetic wave received by the antenna element 20. When the antenna is activated, an electromagnetic wave received by the antenna element 20 is taken out through the static capacitive coupling between the electrode 40 and the electrode 32, is subjected to processing (such as amplification) as required and is supplied to an in-vehicle media system, such as a TV receiver, through an external wire. An electromagnetic wave received by the antenna element 20 may be wirelessly transmitted to an in-vehicle media system through a Bluetooth receiver or a wireless LAN receiver connected to the electrodes 40.

In this embodiment, it is not necessary to connect each of the electrodes 40 and the antenna element 20 on the laminated glass 10 by soldering, and it is possible to connect an in-vehicle media system and the antenna element 20 through static capacitive coupling. Accordingly, it is possible to avoid inconvenience that a heat stress is generated in the glass sheets 12a and 12b because of heat generated during soldering.

In this embodiment, the electrodes 32c are disposed on the mating surfaces 13a of the interior glass sheet 12b. Accordingly, the positional precision in this embodiment is better with respect to the positional displacement between the electrode 32c and the electrode 40 in each couple in comparison with a case the electrodes 32c are disposed on an interior surface of the exterior glass sheet 12a. Additionally, in this embodiment, the electrodes 32c are bonded to the glass sheet 12b as stated earlier. Accordingly, it is possible to obtain static capacitive coupling having high reliability since the positional displacement between an electrode 32c and its coupled electrode 40 is difficult to be caused by influence of expansion or contraction of the intermediate film 14. Although preferred embodiments of the present invention have been described in detail, the present invention is not limited to the above-mentioned embodiments. It is to be understood that various modifications or changes are applicable to the above-mentioned embodiments without departing from the sprit and the scope of the present invention.

Although the above-mentioned embodiments have been described in a case wherein the antenna sheet 30 is disposed between the intermediate film 14 and the mating surface 13a of the interior glass sheet 12b, it is to be understood that the present invention does not exclude a structure wherein the antenna sheet 30 is disposed between the intermediate film 14 and the exterior glass sheet 12a. Even in the latter case, it is possible to obtain an advantage that the antenna element 20 can be bonded and disposed with high positional precision in the laminated glass 10.

The intermediate film 14 cannot always comprise a single layer. The intermediate film may comprise plural layers between the two glass sheets 12. The intermediate film 14 may have another function, such as a sound isolation function or heat reflection function.

The entire disclosure of Japanese Patent Application No. 2004-318022 filed on Nov. 1, 2004 including specification, claims, drawings and summary is incorporated herein by reference in its entirety.

What is claimed is:

1. A method for preparing an antenna-embedded laminated glass, comprising:
    forming a plurality of glass sheets in a curved shape;
    laminating the glass sheets, an antenna element and an intermediate film to form a laminated structure with the intermediate film interposed between adjacent glass sheets, the intermediate film affixing the antenna element and the adjacent glass sheets; and
    press-bonding the laminated structure;
    wherein the laminating step comprises forming the laminated structure by bonding a transfer film to form a conductive strip on a surface of at least one of the glass sheets by use of a bonding strip, and detaching a detachable layer from said transfer film before performing the laminating step so that only the conductive strip and the bonding strip remain on a mating surface of the glass sheets,
    the transfer film including the bonding strip and the conductive strip, wherein the detachable layer is disposed on said transfer strip on a side of the bonding strip,
    the conductive strip forming the antenna element, the surface confronting the intermediate film.

2. The method according to claim 1, wherein the conductive strip includes a linear portion formed in a desired pattern and having a line width (W) satisfying the formula of $0.15 \leq W \leq 0.4$ mm.

3. The method according to claim 2, wherein the surface, to which the transfer film is bonded, comprises a convex surface of the at least one curved glass sheet.

4. The method according to claim 1, wherein the conductive strip includes a linear portion formed in a desired pattern and having a line width (W) satisfying the formula of $0.2 \leq W \leq 0.3$ mm.

5. The method according to claim 4, wherein the surface, to which the transfer film is bonded, comprises a convex surface of the at least one glass sheet of the curved glass sheets.

6. The method according to claim 1, wherein the surface, to which the transfer film is bonded, comprises a convex surface of the at least one glass sheet.

7. The method according to claim 1, which comprising using, as the transfer film, a transfer film including a detachable layer on a side of the bonding strip, and detaching the detachable layer before performing the press-bonding step.

8. The method according to claim 7, which comprising using, as the transfer film, a transfer film including a first detachable layer and a second detachable layer provided outside of the conductive strip, respectively, and detaching the first detachable layer before performing the press-bonding step.

9. The method according to claim 8, wherein the first detachable layer has a stronger bonding force with respect to the transfer film than the second detachable layer.

10. The method according to claim 8, which comprising using, as the transfer film, a transfer film including a first dark strip and a second dark strip provided outside of the conductive strip, respectively, and a first detachable layer and a second detachable layer provided outside of the first dark strip and the second dark strip, respectively.

11. The method according to claim 8, wherein the conductive strip contains soft copper.

12. The method according to claim 8, wherein the first detachable layer contains woodfree paper having a surface polylaminated, or a PET resin sheet.

13. The method according to claim 8, wherein the second detachable layer contains an acrylic adhesive agent.

14. The method according to claim 7, which comprising using, as the transfer film, a transfer film including a dark strip between the detachable layer and the conductive strip.

15. The method according to claim 1, wherein the antenna element is adapted to receive digital broadcasting.

16. The method according to claim 1, further comprising forming the antenna element by using a press to stamp or by printing conductive paste.

17. The method according to claim 1, wherein the bonding strip is made of an acrylic adhesive material.

* * * * *